(12) United States Patent
Williams

(10) Patent No.: US 12,173,522 B2
(45) Date of Patent: Dec. 24, 2024

(54) INFLATABLE STRUCTURE FOR USE IN PAINTING AIRCRAFT

(71) Applicant: Thomas Williams, Montgomery, TX (US)

(72) Inventor: Thomas Williams, Montgomery, TX (US)

( * ) Notice: Subject to any disclaimer, the term of this patent is extended or adjusted under 35 U.S.C. 154(b) by 146 days.

(21) Appl. No.: 18/177,077

(22) Filed: Mar. 1, 2023

(65) Prior Publication Data

US 2023/0203833 A1  Jun. 29, 2023

Related U.S. Application Data

(63) Continuation-in-part of application No. 17/209,330, filed on Mar. 23, 2021, now Pat. No. 11,719,017.

(60) Provisional application No. 63/315,938, filed on Mar. 2, 2022, provisional application No. 63/001,021, filed on Mar. 27, 2020.

(51) Int. Cl.
| | |
|---|---|
| *E04H 15/20* | (2006.01) |
| *B05B 16/40* | (2018.01) |
| *B05B 16/60* | (2018.01) |
| *B05B 16/80* | (2018.01) |
| *B64F 1/222* | (2024.01) |
| *E04H 6/44* | (2006.01) |

(52) U.S. Cl.
CPC .............. *E04H 15/20* (2013.01); *B05B 16/40* (2018.02); *B05B 16/60* (2018.02); *B05B 16/80* (2018.02); *B64F 1/222* (2013.01); *E04H 2015/201* (2013.01)

(58) Field of Classification Search
CPC .............. E04H 15/20; E04H 2015/201; E04H 2015/204; E04H 2015/206; E04H 6/44; E04H 14/00; E04H 3/08; E04H 1/1205; E04H 1/1277; E04H 15/22; B05B 16/40; B05B 16/60; B05B 16/80; B64F 1/222
See application file for complete search history.

(56) References Cited

U.S. PATENT DOCUMENTS

| | | | | |
|---|---|---|---|---|
| 2,411,316 A | * | 11/1946 | Capita ....................... | E04H 6/44 |
| | | | | 52/2.25 |
| 2,830,606 A | * | 4/1958 | Daugherty .............. | E04H 15/20 |
| | | | | 52/2.14 |
| 2,850,026 A | * | 9/1958 | Leatherman ............ | B64F 1/222 |
| | | | | 244/24 |
| 2,854,014 A | * | 9/1958 | Hasselquist ............. | E04H 15/20 |
| | | | | 441/40 |
| 4,192,105 A | * | 3/1980 | Morgan .................. | E04H 15/20 |
| | | | | 52/2.25 |
| 4,805,355 A | | 2/1989 | Plant | |
| 4,959,901 A | * | 10/1990 | Parish ..................... | E04H 15/20 |
| | | | | 135/900 |
| 5,122,400 A | | 6/1992 | Stewart | |

(Continued)

FOREIGN PATENT DOCUMENTS

| | | |
|---|---|---|
| DE | 19506200 | 8/1996 |
| DE | 202007018365 | 6/2008 |

*Primary Examiner* — Robert Canfield
(74) *Attorney, Agent, or Firm* — Werner IP Law, P.C.

(57) ABSTRACT

An inflatable structure for painting aircraft, comprised of a front chamber and a rear chamber. An aircraft can be positioned within the structure. Air vents within the structure create a positive pressure environment within the structure for removing paint fumes and preventing dirt or contaminants from entering the structure.

7 Claims, 6 Drawing Sheets

(56) References Cited

U.S. PATENT DOCUMENTS

| | | | |
|---|---|---|---|
| 5,331,991 A * | 7/1994 | Nilsson | A62B 13/00 135/93 |
| 5,509,927 A | 4/1996 | Epstein et al. | |
| 5,570,544 A * | 11/1996 | Hale | E04H 15/20 52/2.18 |
| 5,706,846 A | 1/1998 | Sutton | |
| 6,001,057 A | 12/1999 | Bongionvanni et al. | |
| 8,479,452 B2 | 7/2013 | Page | |
| 9,776,223 B2 | 10/2017 | Rankin | |
| 9,878,342 B2 * | 1/2018 | Wiliams | B05B 16/40 |
| 10,717,103 B2 | 7/2020 | Williams | |
| 10,766,049 B2 | 9/2020 | Williams | |
| 11,021,885 B2 * | 6/2021 | Williams | G01B 11/167 |
| D959,699 S * | 8/2022 | Yu | D25/1 |
| 2002/0185064 A1 | 12/2002 | Shutic | |
| 2003/0116182 A1 * | 6/2003 | Ueda | E04H 15/20 135/124 |
| 2003/0187082 A1 | 10/2003 | Scherba | |
| 2004/0050411 A1 * | 3/2004 | Lawrence | E04H 15/20 135/128 |
| 2007/0090629 A1 | 4/2007 | Ohnstad et al. | |
| 2007/0095279 A1 | 5/2007 | Langeman | |
| 2010/0272915 A1 * | 10/2010 | Laws | B05B 16/40 454/52 |
| 2012/0090248 A1 * | 4/2012 | Thompson | A63B 63/004 29/897 |
| 2012/0131857 A1 * | 5/2012 | Ross-da Silva | E04H 15/20 52/2.18 |
| 2013/0167452 A1 * | 7/2013 | Jacques | E04H 3/22 52/2.18 |
| 2013/0196589 A1 | 8/2013 | Ramsay et al. | |
| 2015/0017338 A1 * | 1/2015 | Wiliams | B05B 16/80 118/500 |
| 2015/0017897 A1 * | 1/2015 | Wiliams | E04H 1/1205 454/51 |
| 2015/0040487 A1 * | 2/2015 | Wiliams | B05B 16/40 427/238 |
| 2017/0156961 A1 * | 6/2017 | Patel | E04H 1/1205 |
| 2018/0111151 A1 * | 4/2018 | Williams | B05B 16/60 |
| 2018/0187409 A1 | 7/2018 | Williams | |
| 2021/0301549 A1 * | 9/2021 | Williams | E04H 15/20 |
| 2022/0298816 A1 * | 9/2022 | Henderson | B60H 1/00371 |

* cited by examiner

INFLATABLE STRUCTURE FOR USE IN PAINTING AIRCRAFT

CROSS REFERENCE TO RELATED APPLICATION

This application claims priority to U.S. Application No. 63/315,938 filed on Mar. 2, 2022, and is a continuation-in-part of U.S. application Ser. No. 17/209,330, filed on Mar. 23, 2021 and which in turn claims priority to U.S. Application No. 63/001,021 filed on Mar. 27, 2020, the disclosures of which are all incorporated herein by reference for all purposes.

FIELD OF THE INVENTION

The present invention relates to an inflatable structure which can be used for painting or performing maintenance work on aircraft or other large vehicles or machines.

BACKGROUND OF THE INVENTION

Inflatable booths and tunnels have been used for a multitude of purposes. U.S. Pat. Nos. 9,878,342 and 10,766,049, both of which are incorporated herein by reference for all purpose disclose inflatable drive in booths for applying paint to a vehicle. U.S. Pat. No. 10,717,103, incorporated herein by reference for all purposes, discloses an inflatable booth used for spraying bed liner into a truck bed. U.S. Pat. No. 11,021,885, incorporated herein by reference for all purposes, discloses an inflatable booth used in detecting dents in the body of a vehicle. US Publication 2021/0301549, incorporated herein by reference for all purposes, an inflatable drive through tunnel and an attached positive pressure booth to allow medical personnel to take medical samples for diagnostic tests. Each of these prior art inflatable booths allows for a vehicle to be driven partially or completely through an inflatable structure.

SUMMARY OF THE INVENTION

In one aspect, the present invention relates to an inflatable structure which can be used for painting large vehicles, such as aircraft.

In another aspect, the present invention relates to an inflatable structure which provides an environmentally safe area for painting large vehicles, such as aircraft.

These and further features and advantages of the present invention will become apparent from the following detailed description, wherein reference is made to the figures in the accompanying drawings.

DETAILED DESCRIPTION OF PREFERRED EMBODIMENTS

Figure 1:
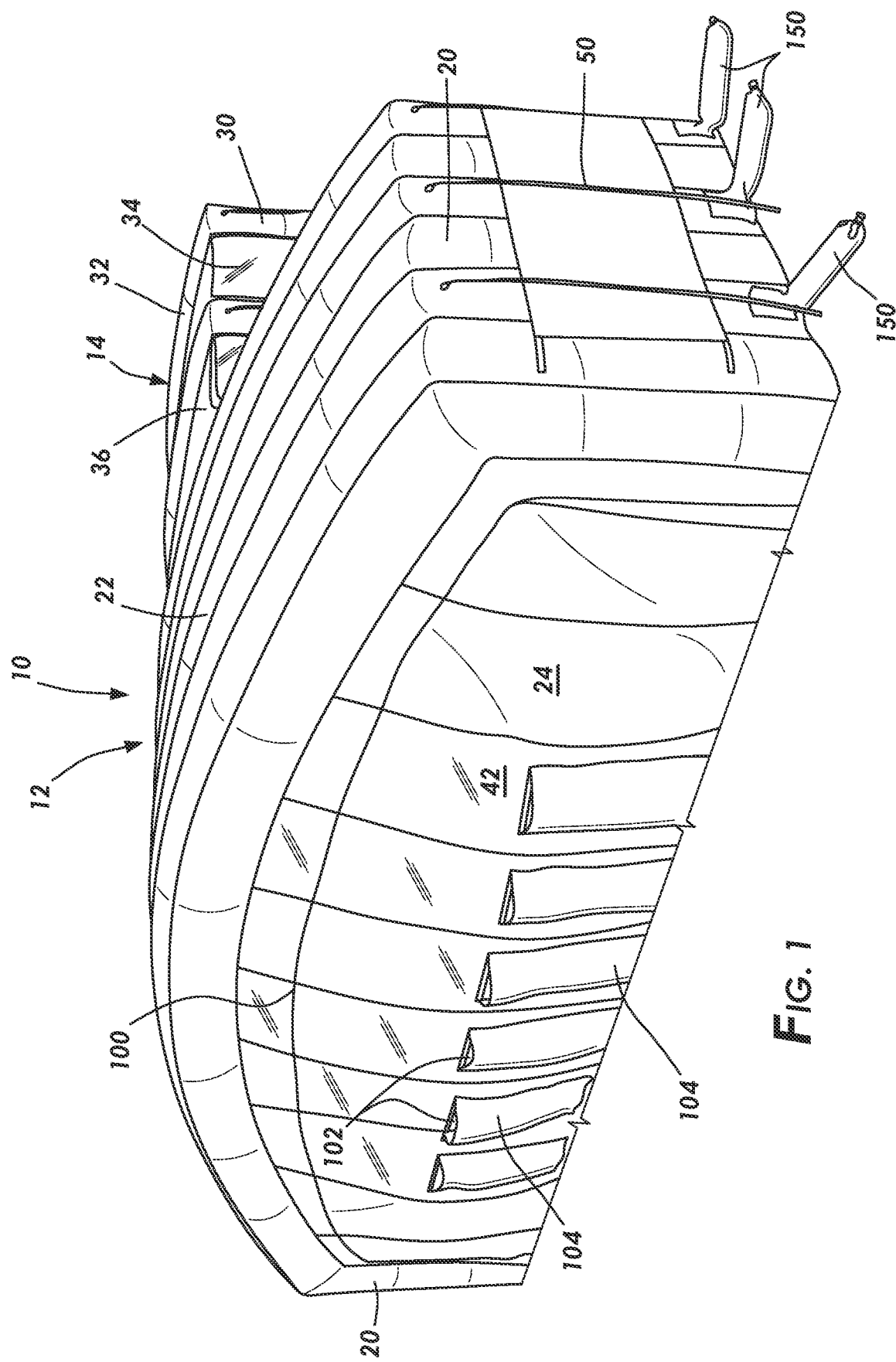
FIG. 1 is a perspective view of the structure of the present invention.

Embodiments of the invention are described more fully hereafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 2:
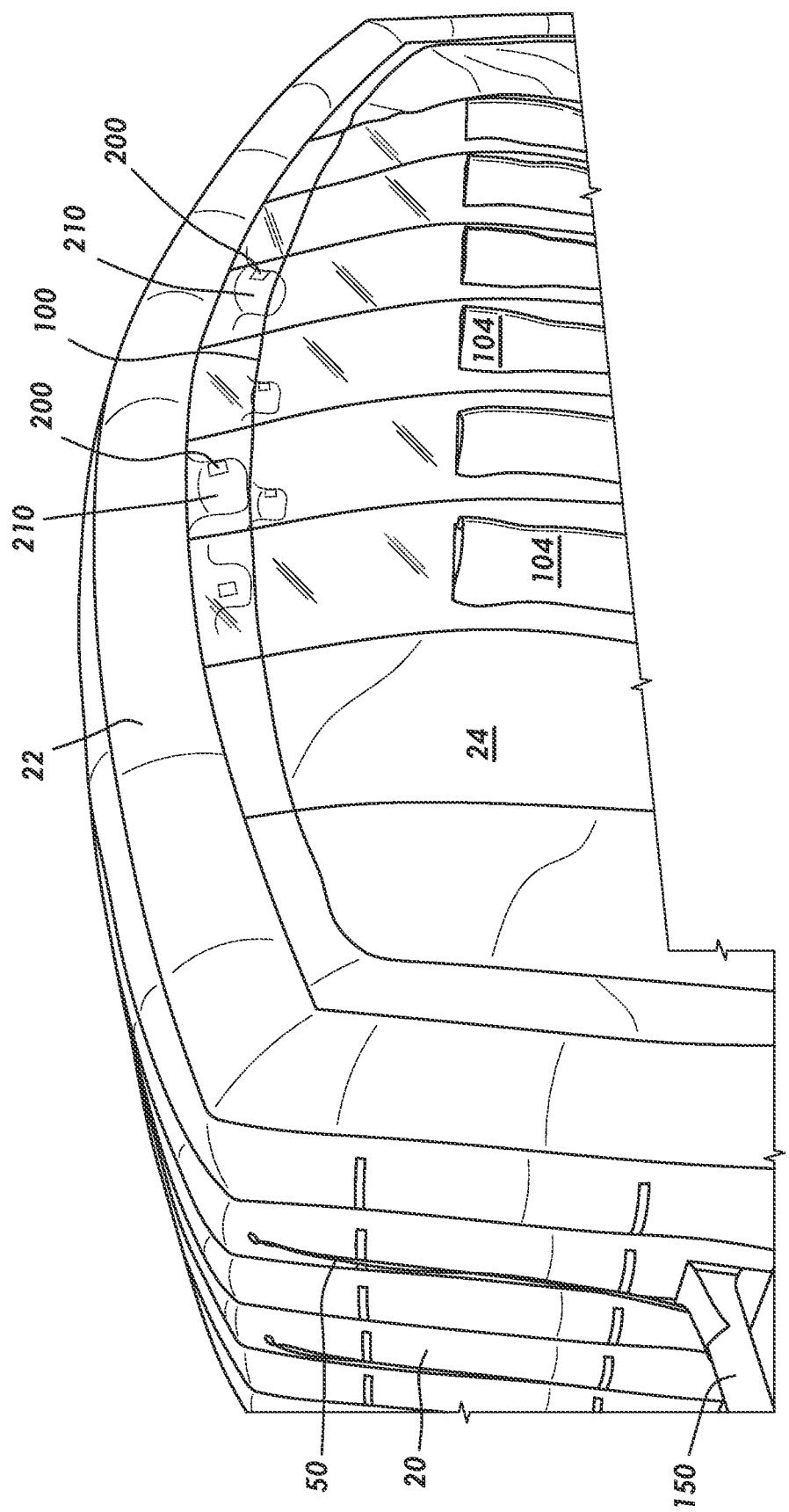
FIG. 2 is another perspective view of the structure of the present invention.
Figure 3:
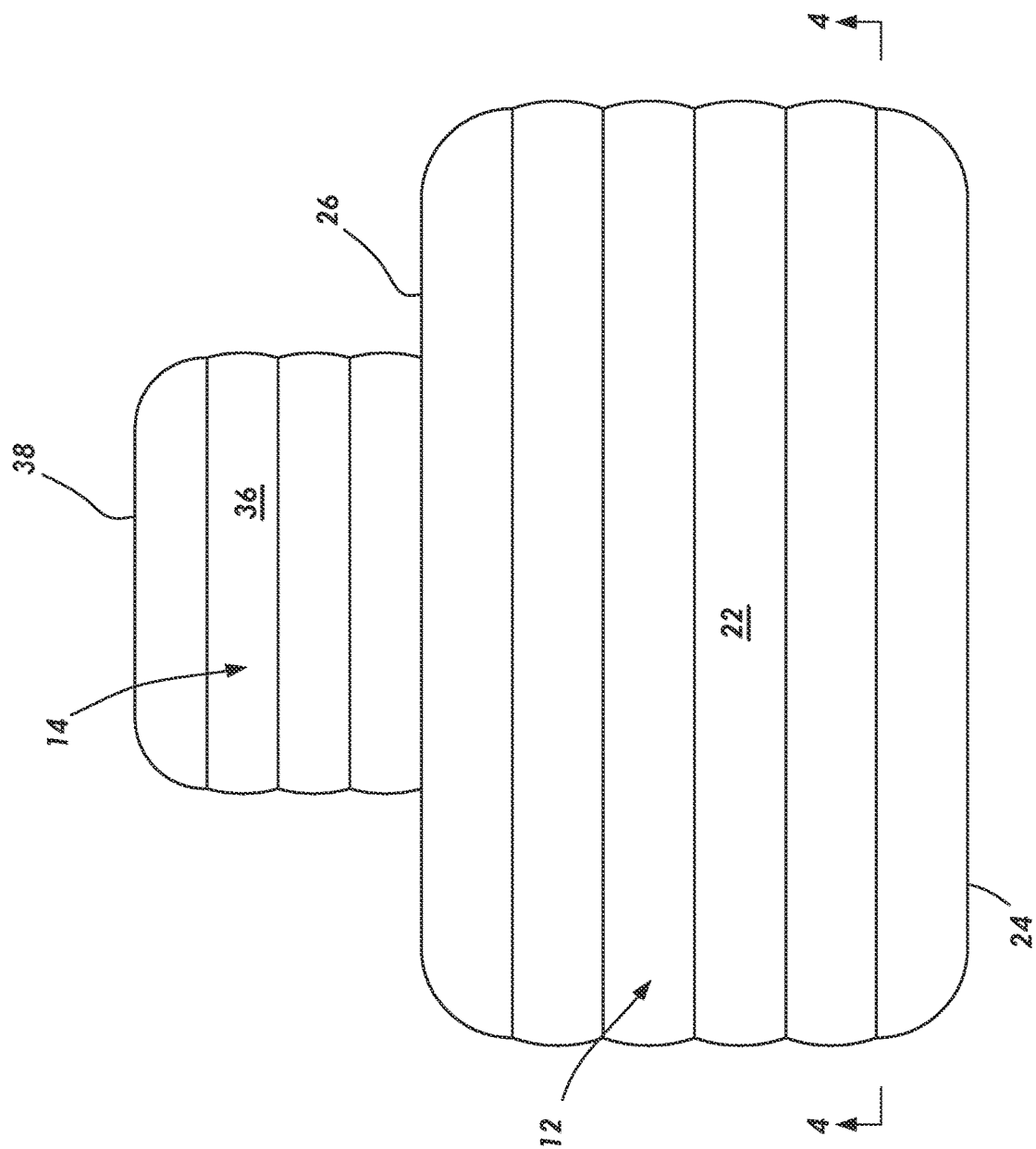
FIG. 3 is a top plan view of the structure of the present invention.

Turning to FIGS. 1 and 2 there is shown generally as 10 one embodiment of the inflatable structure of the present invention. Inflatable structure 10 comprises front chamber 12 and rear chamber 14. Front chamber 12 is comprised of inflatable side walls 20, inflatable ceiling 22, front wall 24, back wall 26, and, optionally, floor 28. The inflatable side walls 20 and inflatable ceiling 22 may be formed from a series of connected inflatable tubes which are in open communication with one another such that each tube does not need to be individually inflated.

Back wall 26 of the front chamber 12 includes an opening which leads into rear chamber 14. Rear chamber 14 is an inflatable frame formed of inflatable vertical columns 30, and inflatable horizontal beams 32, side walls 34, ceiling 36, rear wall 38, and optionally, floor 40. In a preferred embodiment, rear chamber 14 includes an inflatable U-shaped base 42 from which columns 30 extend. In a preferred embodiment all the inflatable portions of rear chamber 14 are in open communication with one another such that each component does not need to be inflated individually. In a preferred embodiment, front chamber 12 and rear chamber 14 are connected to one another without gaps between.

There are a plurality of air inlets 150 around structure 10. Air pumps (not shown) can be connected to air inlets 150 to fill the inflatable portions of structure 10.

Structure 10 is designed for painting aircraft. Accordingly, front chamber 12 is wider than rear chamber 14 to allow for the wingspan of aircraft. In a preferred embodiment, structure 10 is made of a durable antistatic vinyl material.

Because structure 10 is designed for painting, it is important to maintain proper airflow within the structure. Structure 10 includes a plurality of air vents 200. Air vents 200 are openings that allow air to flow into and through front chamber 12 and rear chamber 14. More specifically, air vents 200 allow air that is pumped in to inflate structure 10 to enter front and rear chambers 12 and 14, respectively, and create a positive pressure environment relative to that outside structure 10. In a preferred embodiment, air vents 200 include selectively releasable filters which can capture and contain chemical and dust particles such that they do not enter front or rear chambers 12 and 14, respectively. The filters are preferably removable for easier cleaning or replacement. In a preferred embodiment, the filters attach using hook and loop fabric.

Figure 4:
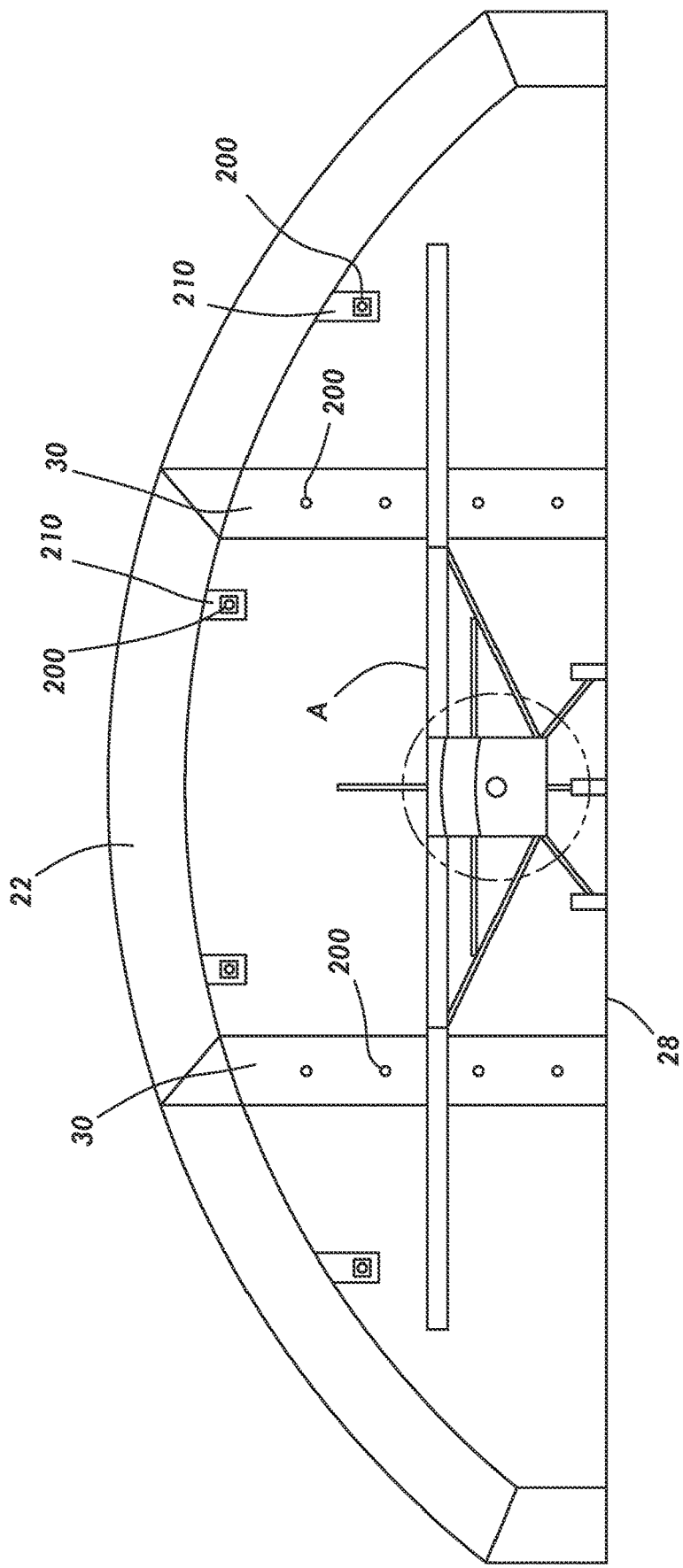
FIG. 4 is a view taken along the lines 4-4 of FIG. 3.

As seen in FIG. 4, air vents 200 are positioned on columns 30 in rear chamber 14. Additionally, inflatable ceiling 22 of front chamber 12 has a plurality of downwardly extending inflatable cylinders 210. Each cylinder 210 has at least one air vent 200 in its side. In a preferred embodiment, all the air vents 200 are positioned such that the air from vents 200 is driven toward front wall 24.

Front wall 24 includes a resealable opening 100 large enough for the aircraft vehicle to pass through. Opening 100 can be fastened by a zipper, hook and loop fabric, or other means well known to those skilled in the art. Front wall 24 also includes at least one, preferably more than one, exhaust panel 102. Each exhaust panel 102 can comprise a replaceable filter 106. The filter 106 in exhaust panel 102 filters the paint fumes exiting the booth such that they do not cause environmental damage. To ensure that the structure stays at a positive pressure relative to the area outside the structure 10, the air is driven through exhaust panels 102 and filters only by the relative pressure from within the structure 10. In other words, air being blown in through vents 200 drives the air in the booth through exhaust panels and filters. There are no external suction devices, fans, or the like which pull air out of the booth. In a preferred embodiment, each exhaust panel includes a removable cover 104 which can be used to direct the flow of air. Cover 104 is releasably attached by zipper, hook and loop fabric, or other means. As shown in FIG. 1, the top edge of cover 104 remains unattached, thus directing air flow from structure 10 upwardly.

Figure 5:
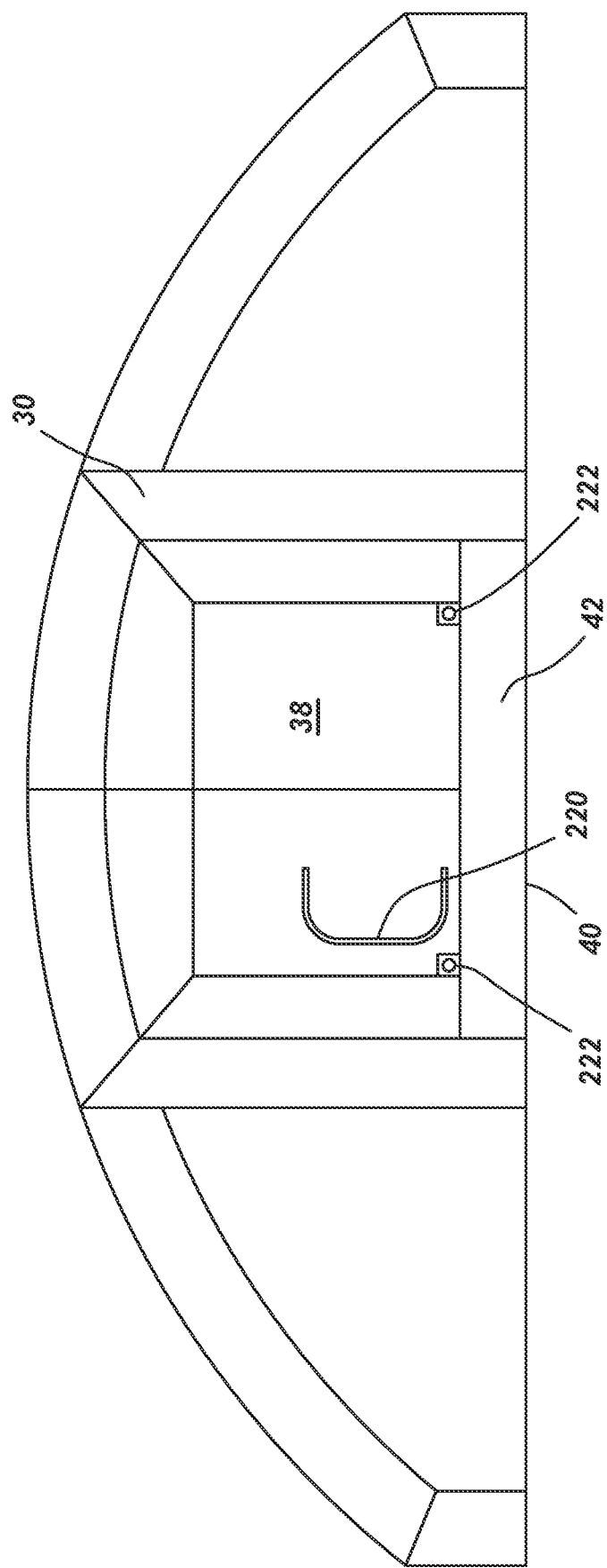
FIG. 5 is a rear view of the structure of the present invention.
Figure 6:
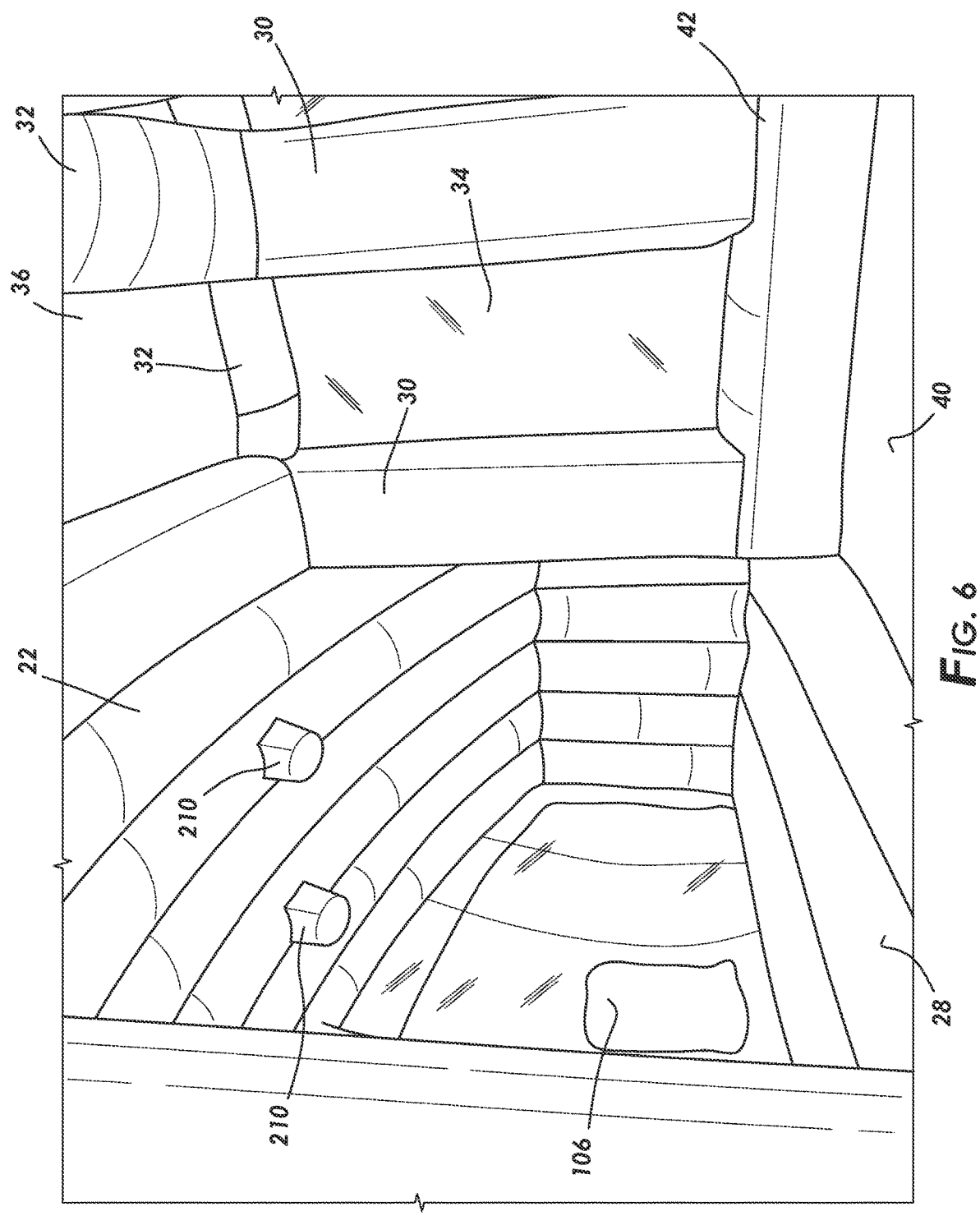
FIG. 6 is a view of the inside of the structure of the present invention.

As seen in FIG. 5, rear wall 38 of rear chamber 14 includes a resealable opening 220. Opening 220 can be large enough for users to enter and leave the structure and to carry equipment into and out of the structure. Wall 38 can also have one or more smaller access openings 222 through which power cords and the like may be passed. Openings 220 and 222 can be sealed by zipper, hook and loop fabric, or other means well known to those skilled in the art.

It will be appreciated that certain features of the present invention may vary but still be within the scope of the invention. For example, exhaust panels may be positioned in different locations in structure 10 and air vents 200 may be positioned to direct air flow in different directions.

By way of example only, to paint an aircraft A, structure 10 is positioned in a desired location and inflated. If necessary, tie downs 50 can be used to anchor structure 10 to the ground. Opening 100 in front wall 24 is opened and the aircraft A to be painted is driven into structure 10. The aircraft A may be moved on its own power or it may be pushed or carried into the booth using other equipment designed for such purposes. When aircraft A is in position, the supplies and equipment needed for painting aircraft A is positioned in structure 10. Any desired filters over air vents 200 are positioned and covers 104 are positioned as desired over exhaust panels 102. Openings 100 and 220 are closed and aircraft A can be painted by personnel inside structure 10. While painting, the paint fumes will be driven by the air from air vents 200 through exhaust panels 102 and out of structure 10.

The structure of the present invention provides multiple advantages. Because structure 10 is inflatable, it can be easily set up, taken down, and relocated as needed. The positive pressure within the booth ensures that dangerous paint fumes are removed from the interior of the booth and are filtered out by the exhaust panels. The positive pressure also prevents dirt or other contaminants from entering the booth, e.g., through the exhaust panels, thus protecting the paint from damage.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An inflatable structure comprising:
    a first chamber comprising inflatable side walls, an inflatable ceiling, a front wall and a rear wall, at least one inflatable cylinder extending downwardly from said inflatable ceiling, said at least one inflatable cylinder being spaced from said side, front, and rear walls;
    a second chamber comprising an inflatable frame work, side walls, a ceiling, and a rear wall; and
    at least one air vent disposed in said at least one inflatable cylinder which allows air to pass from inside said at least one inflatable cylinder into said first chamber to create a positive interior air pressure.

2. The structure of claim 1, further comprising a plurality of inflatable cylinders extending downwardly from said inflatable ceiling, each inflatable cylinder having at least one air vent disposed therein which allows air to pass from inside each respective inflatable cylinder into said first chamber to create a positive interior air pressure.

3. The structure of claim 1, further comprising at least one air vent disposed in said inflatable framework which allows air to pass from inside said inflatable framework into said second chamber to create a positive interior air pressure.

4. The structure of claim 1 further comprising at least one exhaust panel in a wall of said first chamber.

5. The structure of claim 4, wherein said at least one exhaust panel is disposed in said front wall of said first chamber.

6. The structure of claim 4, wherein said at least one air vent faces said at least one exhaust panel to direct air in a direction toward said exhaust panel.

7. The structure of claim 1, further comprising a removable filter positioned over said at least one air vent.

\* \* \* \* \*